INVENTORS.
EDWARD R. ECKERT
FREDERICK V. REHHAUSSER
BY
ATTORNEY

United States Patent Office 3,512,037
Patented May 12, 1970

3,512,037
DOT-SCAN TANGENT-FIX TRACKING TECHNIQUE FOR GRAPHIC DISPLAY SYSTEMS
Edward R. Eckert, West Conshohocken, and Frederick V. Rehhausser, Malvern, Pa., assignors to Burroughs Corporation, Detroit, Mich., a corporation of Michigan
Filed Mar. 3, 1969, Ser. No. 803,797
Int. Cl. H01j *31/12, 29/72*
U.S. Cl. 315—10    12 Claims

ABSTRACT OF THE DISCLOSURE

This disclosure relates to apparatus and method for locating the position of a light pen adjacent to a cathode ray tube employed in a graphic display system, and for the positioning of a tracking symbol at that location. The apparatus and method are adapted to allow the operator of the system to move the tracking symbol to perform various functions such as "drawing" segments on the face of the cathode ray tube or to identify data in various forms displayed on the cathode ray tube. The system and method employ a dot-scan tangent-fix tracking technique in which a coarse scan is first employed to locate the vicinity of the sensitive area of the light pen after which a first fine scan is made to determine a point representing the horizontal tangent to the light pen circle and then a second fine scan is made to determine the vertical tangent to the light pen circle. The locations of the latter two points are corrected to represent the location of the center of the light pen circle by the addition of the radius of the light pen circle. The system disclosed is a digital system and the various scans are carried out in incremental steps during the refresh portion of the cathode ray tube cycle.

Background of the invention

This invention relates to a graphic display unit employing a light pen and particularly to such a system wherein a light pen may be employed to move a tracking symbol across the display screen at an optimum rate.

Light pens are devices which with the use of photomultipliers or logarithm amplifiers and the fluorescing of phosphor particles on the CRT screen are able to detect and identify locations on the face of the CRT screen. These devices have been used to point to elements of the data structure represented on the CRT screen and to identify them in terms of a data file or list in a computer or computer memory. This allowed an operator to specify an element of pattern upon which to execute some action or command. It also allowed the operator to specify a position, angle and length of line which the operator wished to have included in the pattern and led to the development of "drawing" on the CRT screen with the use of the light pen. The latter technique of causing a computer to project some prestored design onto the CRT screen in response to use of the light pen was tedious and techniques were developed to allow the operator to create patterns on the CRT screen by employing a "tracking symbol" and means for storing the coordinate position of this symbol so that the magnitude of the coordinate value could be readily changed and the "tracking symbol" could be caused to follow the light pen across the CRT screen.

A typical manner in which a symbol is caused to track a light pen is one wherein two opposed points on the light pen circle are determined and compared to the position of the tracking symbol. If the distances between the tracking symbol center and the points are not equal the tracking symbol is moved to equalize those distances. This technique is usually implemented with analog or variable voltage components although digital methods can also be employed to implement this technique. An advantage of digital method is that greater accuracy of positioning may be obtained.

A disadvantage of prior art systems of the type so far described is that the operator is limited in respect to the velocity with which he may move the light pen across the CRT screen without losing the tracking symbol. Early systems provided a movement rate of 3 or 4 inches per second. However, more recently developed systems can provide a rate of up to 7½ inches per second with improvements in components and circuit techniques. This latter rate is somewhat of a theoretical maximum imposed by the refresh considerations of the CRT system itself. However, this latter rate is still relatively slow so as to hamper or slow down the operator's usage of the light pen.

It is, then, an object of the present invention to provide an improved graphic display system employing a light pen.

It is another object of the present invention to provide an improved graphic display system in which the operators' usage is not hampered by the rate at which the light pen may be moved across the face of the CRT screen.

It is still another object of the present invention to provide an improved graphic display system in which, should the light pen be lost by the tracking symbol, tracking may again be reestablished without requiring the operator to go back and pick up the tracking symbol providing that the light pen is still adjacent to the CRT.

It is still a further object of the present invention to provide an improved graphic display sysem wherein the coordinate position of the tracking symbol is corrected, should the light pen be moved too rapidly, to bring the tracking symbol into optical contact with the light pen.

Summary of the invention

The above objects are achieved by an implementation of a searching technique that includes both a coarse scan and a fine scan of dot-raster in the area of the light pen. The coarse scan mode, which may be of the entire CRT screen, is provided to determine the area in which the light pen resides, and, then, the fine scan mode is provided to determine the horizontal and vertical tangents to the light pen circle from which the X and Y coordinates are obtained by adding the radius of the light pen circle to the positional values of the vertical and horizontal tangents.

Specific features of the present invention reside in adapting the coarse scan mode to excite only selected portions of the dot-raster so as to reduce occurrences of saturation of the light pen. Additionally, the fine scan mode is carried out only until a sensitive area of the light pen is detected. Each of the scan modes is carried out in incremental steps controlled by algorithms that are readily implemented by digital techniques.

Another feature of the present invention resides in the carrying out of the scan modes during the refresh period of the CRT in a time sharing manner with the other functional modes of the CRT such as vector and symbol generation.

With the present invention, should the light pen be almost instantaneously moved from one position to another on the face of the CRT, it will nevertheless be detected and located by the scanning techniques as herein disclosed.

Description of the drawings

The above and other objects and advantages and features of the present invention will become more readily apparent from a review of the following specification when taken in conjunction with the drawings wherein.

Description of the system

Figure 2:
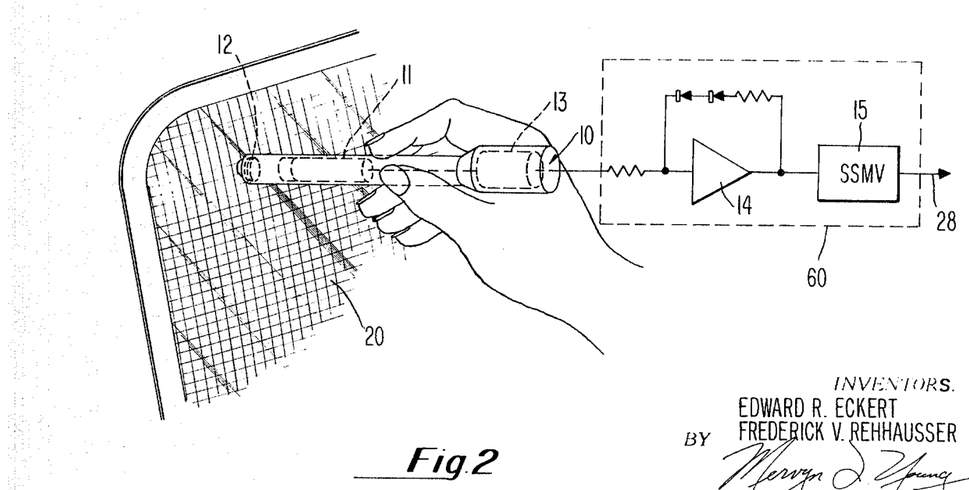
FIG. 2 is a schematic diagram illustrating one type of light pen that may be employed with the present invention.

A typical light pen system which may be employed in the present invention is illustrated in FIG. 2. Light pen 10 includes photo-transistor 11 and optical lens 12 to project an image upon the surface of the photo-transistor 11 in response to which a signal is generated and amplified by the preamplifier 13. The output signal from light pen 10 is transmitted to amplifier 14 which is a logarithmic amplifier adapted to provide an output signal of a particular shape as required to trigger single-shot multivibrator 15. The output signal from single-shot multivibrator 15 is then transmitted to the system of the present invention, as will be more thoroughly described below.

Figure 1A:
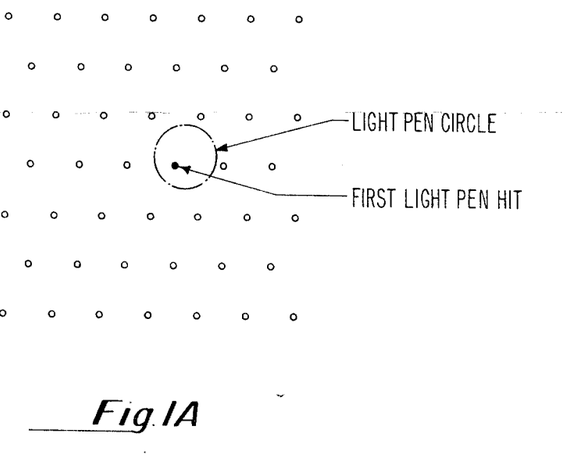
FIG. 1A illustrates the relation between the coarse raster employed with the present invention and the sensing area of the light pen.

As illustrated in FIG. 2, the light pen 10 is adapted to be moved across the face of CRT screen 20 such that when light from a fluorescing phosphor is detected, a pulse will be generated by single-shot multivibrator 15 and transmitted to the system of the present invention. The manner in which the present invention allows a light pen to be employed to move a tracking symbol across the face of CRT screen 20 is best described in relation to FIG. 1A and FIG. 1B which illustrate the scanning patterns which would be seen on CRT screen 20 during the coarse scan and the fine scan modes respectively. During the coarse scan mode, the CRT is unblanked with a periodicity such that every eighth bit element on the CRT screen is excited along a horizontal line and upon completion of the scanning of that line, a new scan is incremented along a horizontal line eight bit elements below the previous line as illustrated in FIG. 1A. The distance between sample elements will be approximately 0.125 inch which dimension is also the effective diameter of the light pen circle, the area of which is that to which the light pen is sensitive. As indicated in FIG. 1A, alternating rows of excited elements have been shifted horizontally by half the distance between excited elements to create a scan pattern such that one of the excited elements will fall within the light pen circle when the light pen is in the scan area. When the light pen has detected an excited element, the coordinate values of the location of that element are reduced in value by eight grid increments both horizontally and vertically to establish the position from which the fine scan mode is to be initiated.

Figure 1B:
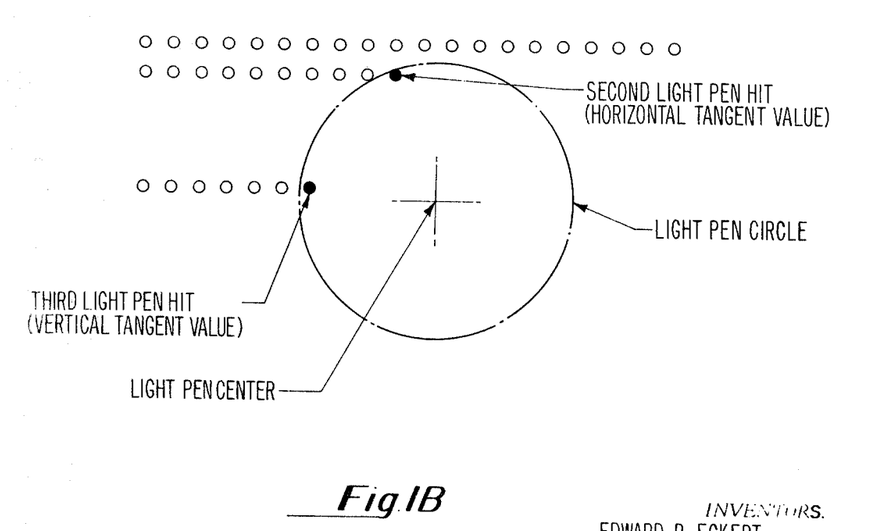
FIG. 1B illustrates the relation between the fine rasters employed in the present invention and sensing area of the light pen.

As indicated in FIG. 1B, the fine scan pattern is adapted to excite each element in the fine scan field the dimensions of which are sufficient to be able to completely include the light pen circle therein. The fine scan mode involves the sequential excitation of each of the elements in the grid along a horizontal line throughout the fine scan field. If the light pen is not detected the excitation of an individual element in the scan is continued along the next row of grid elements in the field and the process is continued until the light pen does detect a fluorescing element. The coordinates of that element then represent a horizontal tangent to the light pen circle. A value corresponding to 0.0625 inch is then added to the Y coordinate and the X or horizontal coordinate is again reduced by an amount equal to 16 incremental distances to specify the location in which a second fine scan mode is initiated and during which each element of the row is excited sequentially until a fluorescing element is detected by the light pen. This last point represents the vertical tangent to the light pen circle and to the X coordinate value representing this point, an amount representing the radius of the light pen circle (0.0625 inch) is added to specify the X coordinate of the center of the light pen circle.

Except for certain corrective functions, the scanning mode of the present invention has been completed and is then re-initiated to periodically detect any movement of the light pen. The specific sequences of the coarse scan and fine scan algorithms employed to control the scanning action of the present invention will be more thoroughly described below.

Figure 3:
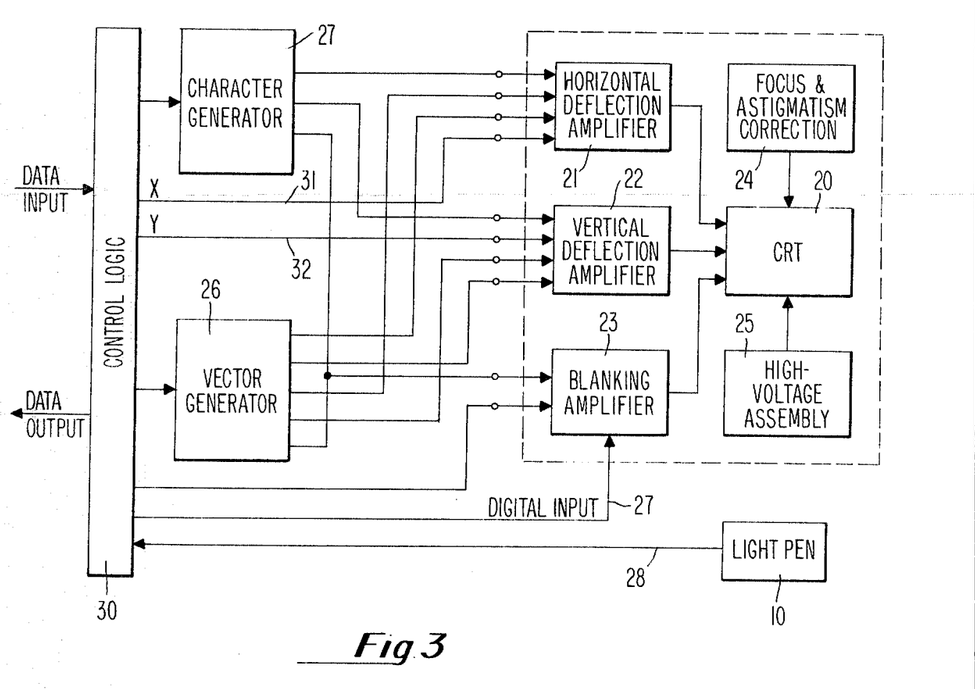
FIG. 3 is a schematic digaram of the system employing the present invention.

A display system of the type employing the present invention is illustrated in FIG. 3. This system includes a cathode ray tube 20, horizontal deflection amplifier 21, vertical deflection amplifier 22, blanking amplifier 23 as well as power supply 25 and focus and astigmatism control 24 as will be understood by one skilled in the art. This system is adapted for graphic display and includes character generator unit 27 and vector generator unit 26 which are controlled by a control logic 30 which also controls the scanning technique of the present invention. That is to say, that the scanning technique of the present invention, and character and vector generation are all controlled by control logic 30 on a time shared basis during the refresh cycle of CRT 20.

Figure 4:
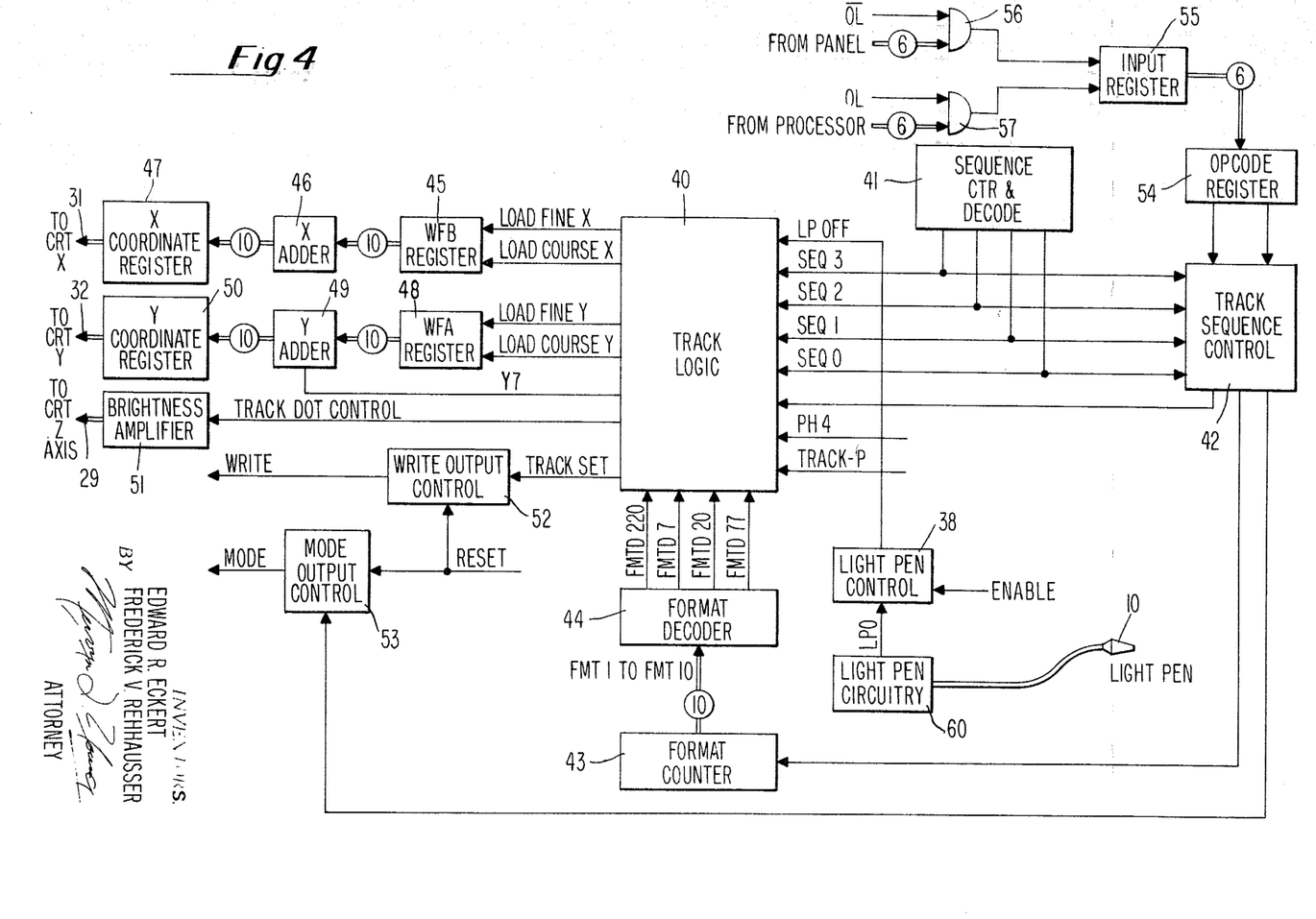
FIG. 4 is a schematic diagram of the control logic of the present invention.

That much of the control logic which is required to implement the present invention is disclosed in FIG. 4. The principal subunits in FIG. 4 are the track sequence control 42, the sequence counter 41 and the track logic 40. Sequence counter 41 in essence provides the timing signals and conditions both track logic 40 and track sequence control 42 to reside in the appropriate modes required for whatever sequence the system is then in. Track sequence control 42 serves primarily to increment and to reset format counter 43 that in turn provides appropriate data values and control signals to the track logic 40 by way of format decoder 44 to set write field A register 48 and write field B register 45 which in turn supply the coordinate values to Y register 50 and X register 47. It is the contents of these latter registers that determine the location of the spot on the face of CRT 20 that is currently being scanned by the system. Track control logic 40 also controls brightness amplifier 51 which supplies the Z axis data for the blanking of CRT 20.

As indicated in FIG. 4, the respective busses between Y register 50 and Y adder 49 and also between X register 47 and X adder 46 are provided with appropriate gates for the transmission of data in either direction. Thus, for example, when it is desired to add the contents of write field B register to the X register, the contents of write field B register 45 and X register 47 are supplied to the X adder with the resultant sum being transferred back to the register 47.

Format counter 43 is a ten-bit up-down counter which counts the number of X increments by which the CRT beam is to be shifted from the origin or center of the CRT. The format counter is increased one count after each dot when dot matrix is displayed. The count reached by the format counter is determined by the sequence in which the display is operating and the activation of the light pen. In sequence 2, the count is increased by 1 for each dot displayed. In sequence 2, 64 dots are displayed; if the light pen is not activated by one of the displayed dots before the format counter reaches the count of 64, the format is reset to zero. If a dot activates the light pen, the display console operation is shifted to sequence 1. In sequence 1, a maximum of 144 dots can be displayed; if the light pen is not activated by one of the displayed dots before the format counter reaches a count of 144, the format counter is reset to zero. If the light pen is activated by one of the dots the display console operation is shifted to sequence 0 in which a single row of 16 dots is displayed. If the light pen is not activated by the time format counter reaches the count of octal 16, the format counter is reset to zero. If the light pen is activated by one of the dots, the format counter is reset to zero and the X and Y registers are up-dated with the new light pen X and Y coordinate positions. Therefore, it can be said that the resetting of the format counter also signifies that the new light pen position has been found or if a new position is not detected, the old position is retained.

Sequence counter 41 is a two-stage down-counter which is counted down from 3 to set the track logic for each of the scanning sequences currently being performed.

Write output control 52 and mode output control 53 are provided primarily to supply information signals to a data processing system when the display system of the present invention is operated under the control of such a data processing system. Similarly, op code register 54 and input register 55 are adapted to receive commands from such data processing system by way of gate 57 and also to receive commands from a panel control by way of gate 56. It will be understood that while the present system is adapted to be controlled by a data processing system, that such control is not required for the present invention and that the scanning technique of the present invention can be carried out by the graphic display unit without such data processing control.

As was indicated above the only additional information required by the control system of FIG. 4 is the light pen signal which is amplified by the light pen circuitry 60 to set a flip-flop in light pen control 38 as it is the status of the light pen flip-flop in control 38 that is supplied to the tracking logic 40.

Description of the operation

Figure 5:
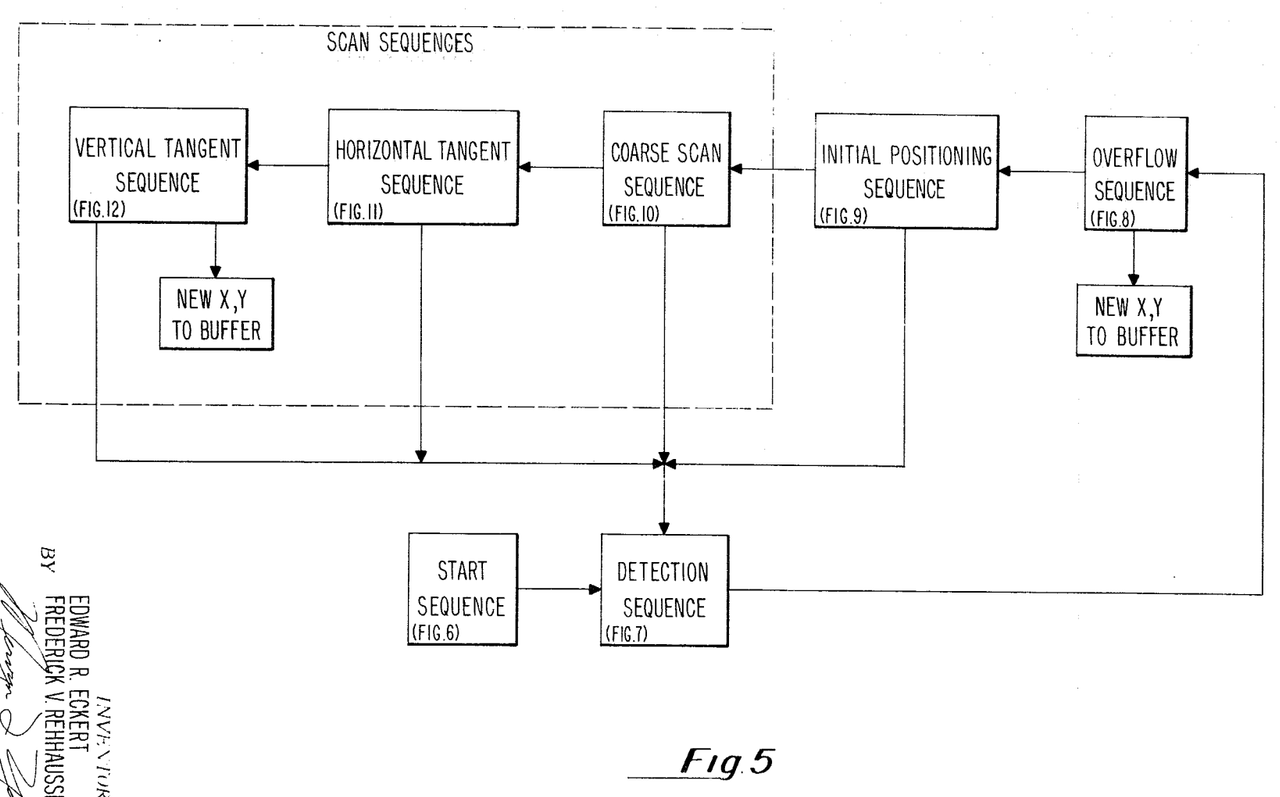
FIG. 5 is a digaram of the operation of the present invention.

The form of the track logic circuitry in the track logic unit and also of the circuitry and gates in sequence control 42 will be apparent to one skilled in the art when it is understood what functions are performed by these units. To provide a better understanding of the manner in which the tracking technique of the present invention is implemented, a description of the operations of the control unit of FIG. 4 will now be given in reference to FIGS. 5–12 wherein FIG. 5 is a diagram of the entire operation and the remaining figures are diagrams of individual sequences in the operation.

Figure 6:
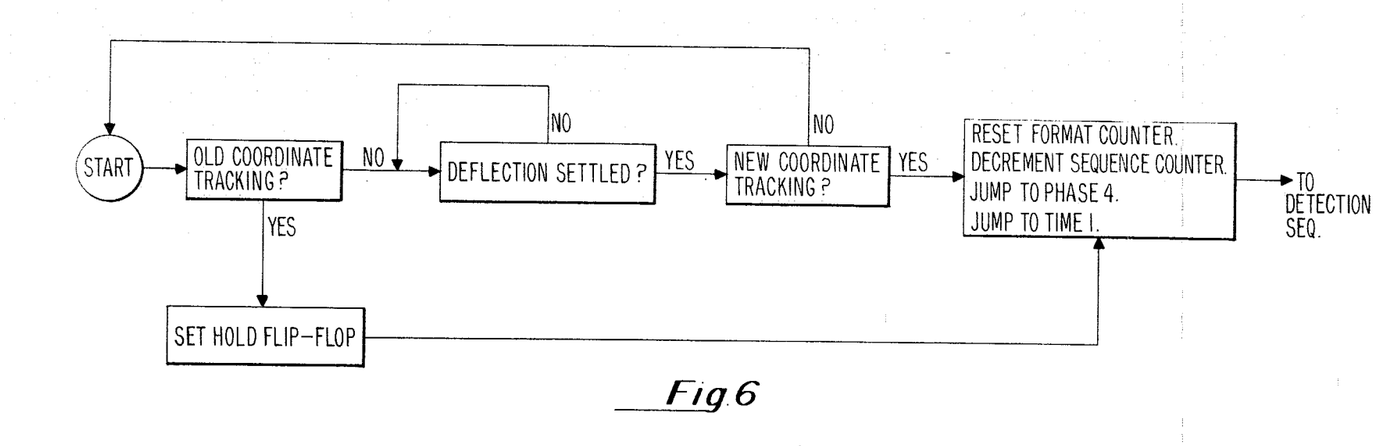
FIG. 6 is a diagram of the start sequence.

As indicated in FIG. 6, the start sequence which is initiated in response to an op code being presented to op code register 54 of FIG. 4, results in the initiation of a detection sequence which is primarily the unblanking and blanking of the CRT 20 and detecting whether or not the light pen has been energized, after which an overflow sequence is entered to determine whether or not the respective registers have been incremented to their maximum desirable values. This last sequence is primarily for the purpose of reinitiating the entire process should the various scanning sequences have been carried out without detecting the light pen. The remaining sequences to follow sequentially are first the positioning sequence which designates the position from which the coarse scan is to be initiated, the coarse scan sequence to first locate the general area of the light pen, the horizontal tangent sequence and the vertical tangent sequence, the latter two of which are to detect points on the light pen circle as has been described above.

As indicated in FIG. 6, the start sequence which is initiated by supplying an operation code to operation code register 54 of FIG. 4, results in the system first checking the coordinate values to see whether or not they are new coordinate values and if they are not a hold flip-flop is set. The circuitry which performs this step has not been shown in FIG. 4 since this step is relevant to a final fixing of the tracking symbol and not to the actual scanning technique of this invention. When it is determined that the system is in a new coordinate tracking mode as indicated by the code in register 54, format counter 43 of FIG. 4 is reset, sequence counter 41 is decremented and the system is placed in phase 4 which is the tracking mode performed by the present invention. The other phases which are performed by the system and are not disclosed in this specification are phase zero which is an idle phase, phase 1 which is the initiate phase which performs a sequence of steps illustrated in FIG. 6, phase 2 which is a character generation phase and phase 3 which is a vector generation phase. It will be remembered that the tracking mode or phase 4 is performed in a time shared or multiplexed manner with phases 2 and 3 during the refresh portion of the CRT cycle.

Figure 7:
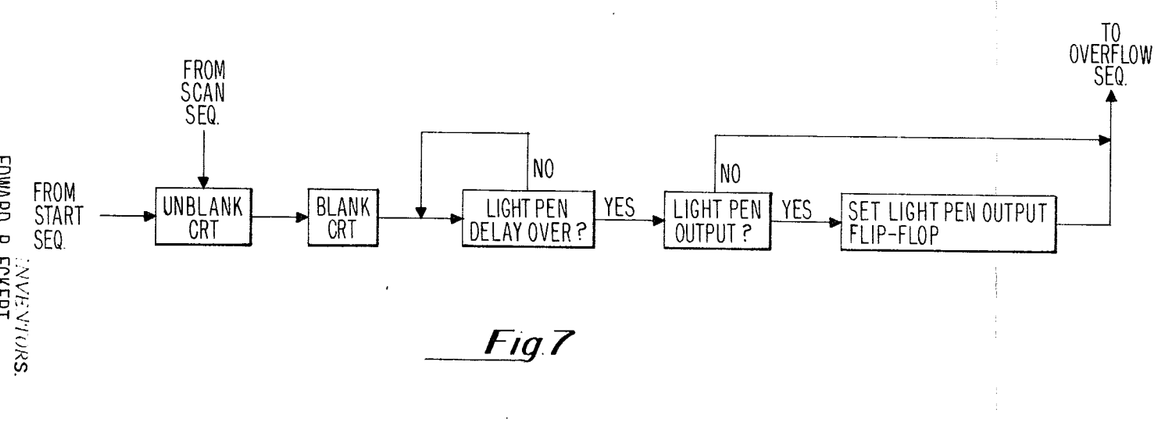
FIG. 7 is a diagram of the detection sequence.

Once the system is in the tracking phase, a detection sequence is performed in the manner illustrated in FIG. 7. This sequence initiates the unblanking and blanking of the CRT and the detection of signal generated by the light pen. If a signal is received from the light pen, then a flip-flop in light pen control 38 of FIG. 4 is set to indicate this condition.

Figure 8:
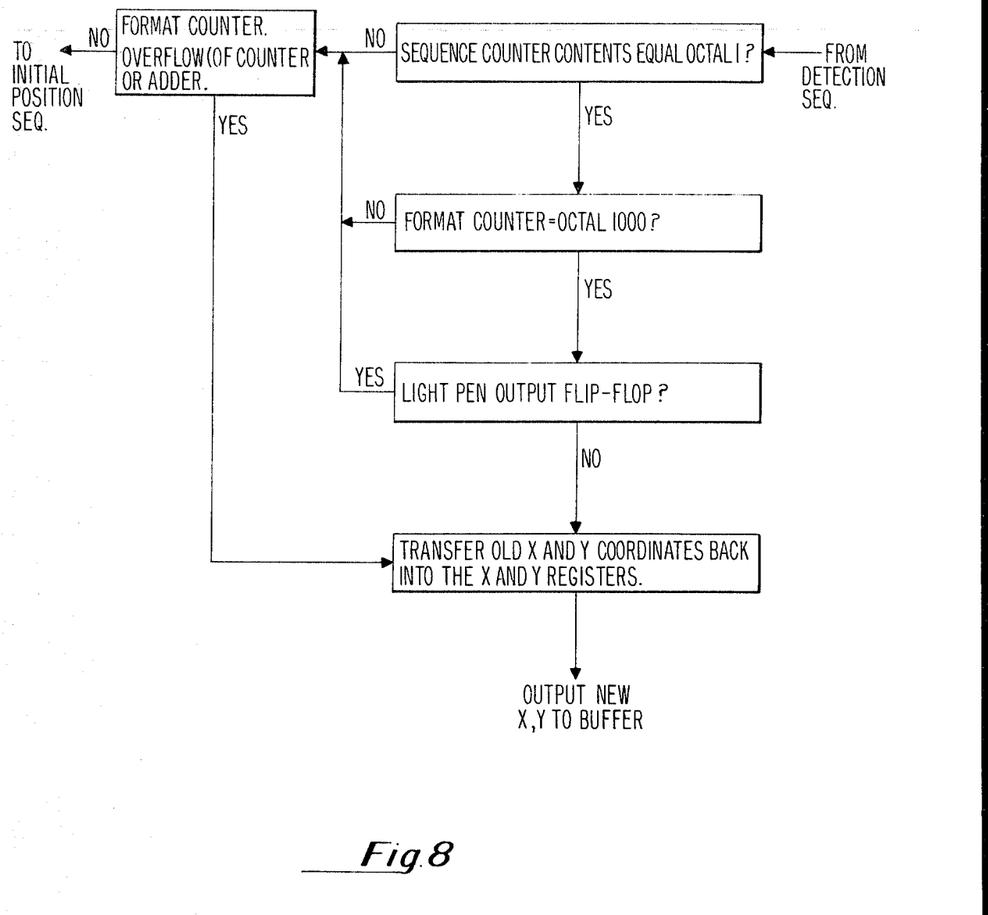
FIG. 8 is a diagram of the operation of the present invention during the overflow sequence.

As indicated in FIG. 5, the system next enters an overflow sequence which is illustrated in FIG. 8 and is for the purpose of ascertaining whether or not the sequence counter and format counter contain proper values. That is to say, the overflow sequence is a safety measure to make certain that the system has not completely scanned the face of CRT 20 without detection having been made by light pen 10.

It will be noted in the overflow sequence of FIG. 8 that this sequence is entered when the sequence counter equals one. It will be remembered that the sequence counter is to be decremented through four different stages which are represented by the sequence counter equaling 3, 2, 1 and 0. When the sequence counter equals 0 and is then decremented, it will again equal 3. In FIG. 5, the sequence counter being set to 3 causes the system to enter the initial positioning sequence, the sequence counter being set to 2, causes the system to enter the coarse scan sequence, the sequence counter being set to 1, causes the system to enter the horizontal tangent sequence and the sequence counter being set to 0, causes the system to enter the vertical tangent sequence.

Figure 9:
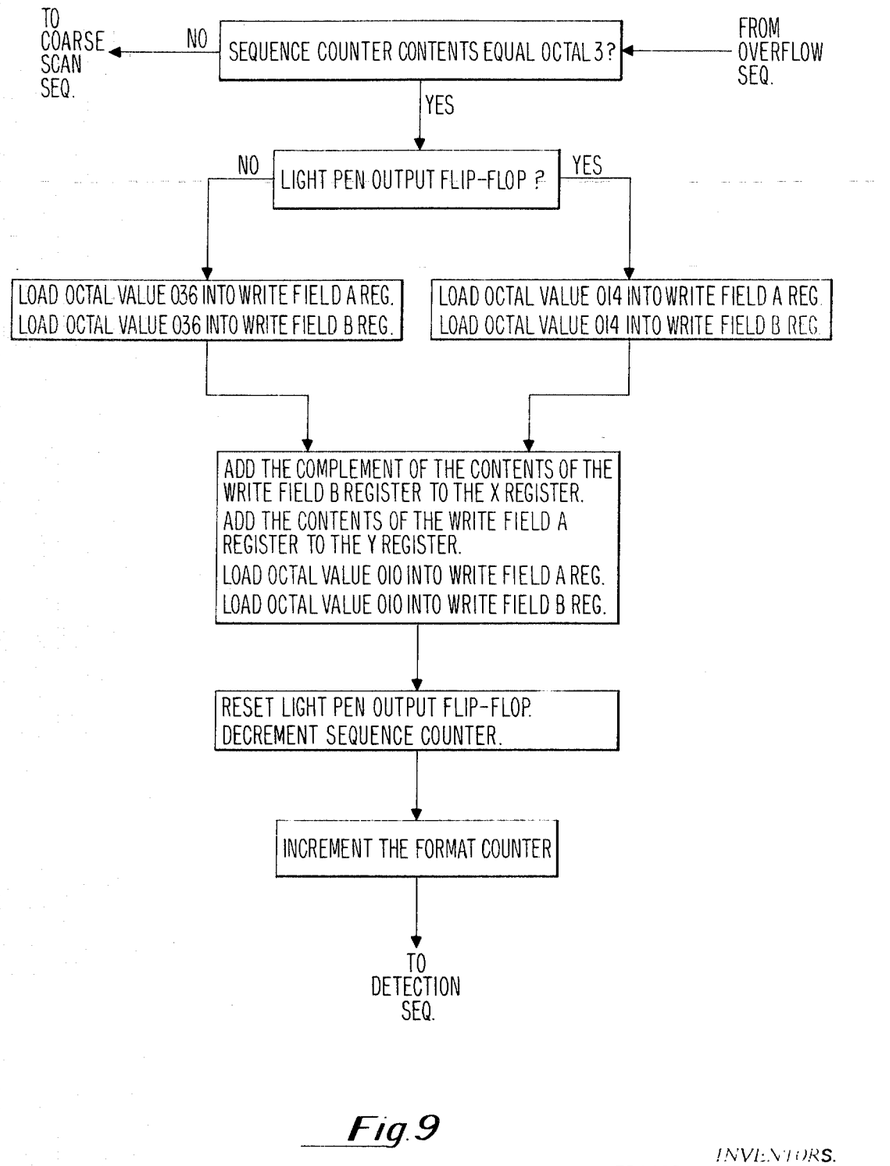
FIG. 9 is a diagram of the operation of the present invention during the positioning sequence.

After the overflow sequence, the system then enters the initial positioning sequence in which, in essence, the system picks a location on the CRT screen from which the coarse scan is to be initiated, and which position is to the left and above of the area in which the light pen is supposed to be residing. As indicated in FIG. 9, this sequence is entered when the sequence counter equals 3. The first step of this sequence is to determine whether or not there has been a light pen output signal during the unblanking and blanking of the CRT. If there has not been such an output, then the values of 036 are entered into both the write field A register 48 and the write field B register 45 of FIG. 4. The complement of the contents of the write field B register are added to the X register, that is to say, the contents of the write field B register are subtracted from the X register, and the contents of the write field A register are added to the Y register. This has the effect of selecting a location on the face of the CRT which is 30 elements to the left and 30 elements above the previous location specified by the X and Y registers. The light pen output flip-flop is then reset and the sequence counter is decremented to equal 2. The format counter is incremented and the system then re-enters the detection sequence as illustrated in FIG. 7.

Figure 10:
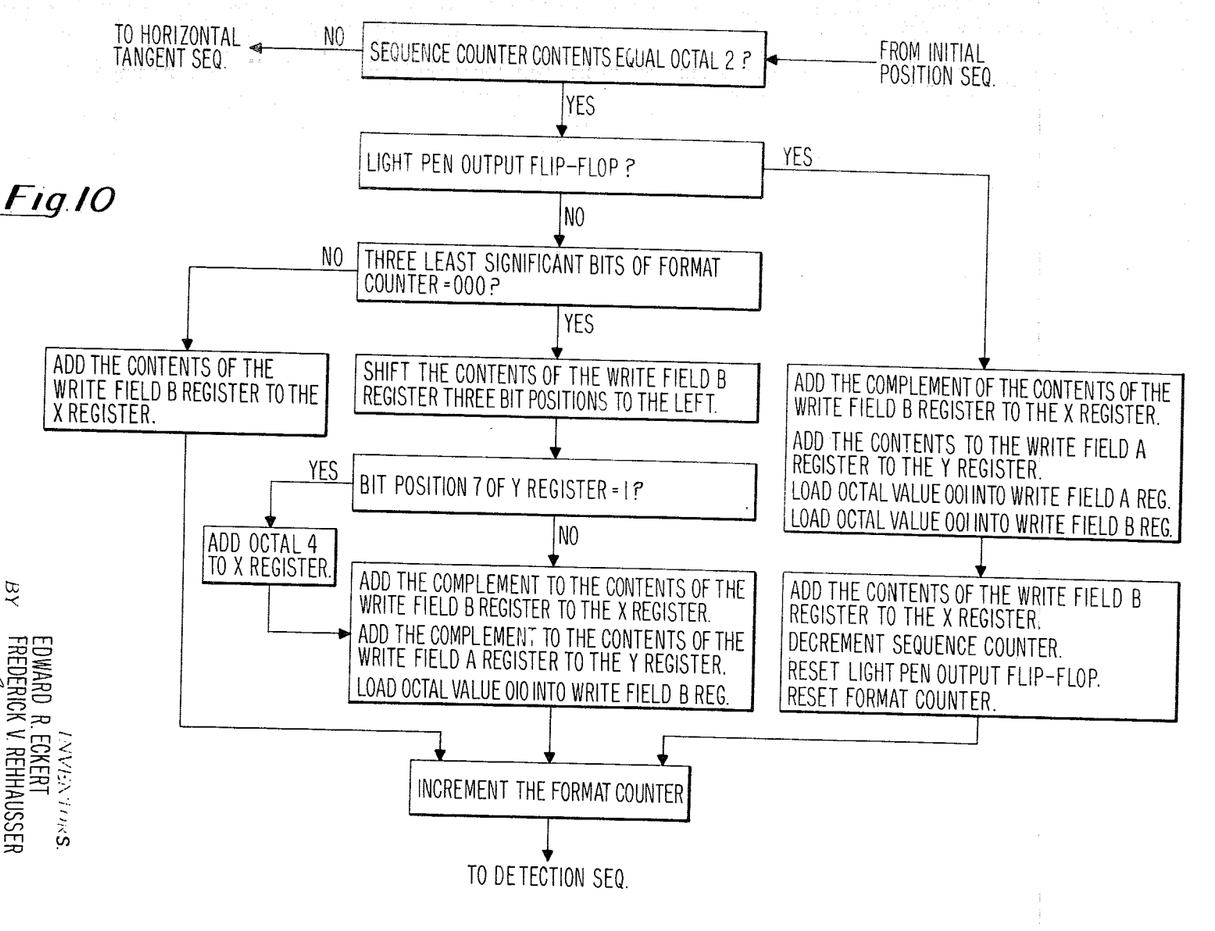
FIG. 10 is a diagram of the coarse scan sequence.

Should a light pen output have been detected during the unblanking and blanking of the CRT then, in the initial positioning sequence of FIG. 10, the value of 12 or octal 14 is subtracted from the X register and added to the Y register to specify the new location which is 12 elements to the left and 12 elements above the previous location. The remaining steps of the initial positioning sequence are then carried out and the system again enters the detection sequence.

The sequence counter having been decremented to 2, the system then enters the coarse scan sequence after the detection sequence. The coarse scan sequence is illustrated in FIG. 10. The first step in the coarse scan sequence is to note whether or not there has been a light pen output signal. If not, then the track logic 40 causes the contents of the write field B register to be added to the Y register if the least significant three binary bits of the former counter do not equal 000. It will be noted from FIG. 9 that the values of 8 or octal 10 loaded into both the write field A register and the write field B register when the system was in the initial positioning sequence. The significance of this portion of the coarse scan sequence is that a new element location has been chosen on the face of the CRT which is 8 elements distance from the previous location but in the same row or with the same vertical address as the previous location.

If the least significant three binary bits of the format counter equal 000, then the system has reached the end of the area in which the coarse scan is being carried out on the face of the CRT. To start the scan along the next row, the contents of the write field B register are shifted three bit positions to the left and the new contents of the write field B register are subtracted from the X register. The contents of the write field A register are subtracted from the Y register and the octal value of 10 is loaded into the write field B register. Before the contents of the write field B register are subtracted from the Y register, track logic 40 determines if bit position 7 of the Y register equals 1. If so, the octal value of 4 is added to the X register. The format counter is incremented and the system again enters the detection sequence.

The significance of this last sequence is that a new row has been selected for the coarse scan and the elements selected for excitation during this scan have been shifted horizontally relative to the elements excited during the scan of the previous row. This is indicated graphically in FIG. 1A and is done for the purpose of insuring that a scan passed the light pen will be detected, that is to say, that the shifting of alternate rows of element locations insures that one of the selected locations will reside within the light pen circle.

If a light pen output signal has been generated during the coarse scan sequence, the contents of the write field B register are subtracted from the X register and the contents of the write field A register are added to the Y register. The octal value of 1 is loaded into both the write field A register and the write field B register. The contents of the write field B register are then added to the X register. The sequence counter is decremented to 1, the light pen output flip-flop is reset, the format counter is reset and then incremented to 1 and the system again enters the detection sequence. The significance of this last sequence is to specify a location on the CRT screen which is ten units to the left and above the location where the light pen has been detected and to prepare the system for carrying out the fine scan in one unit increments.

Figure 11:
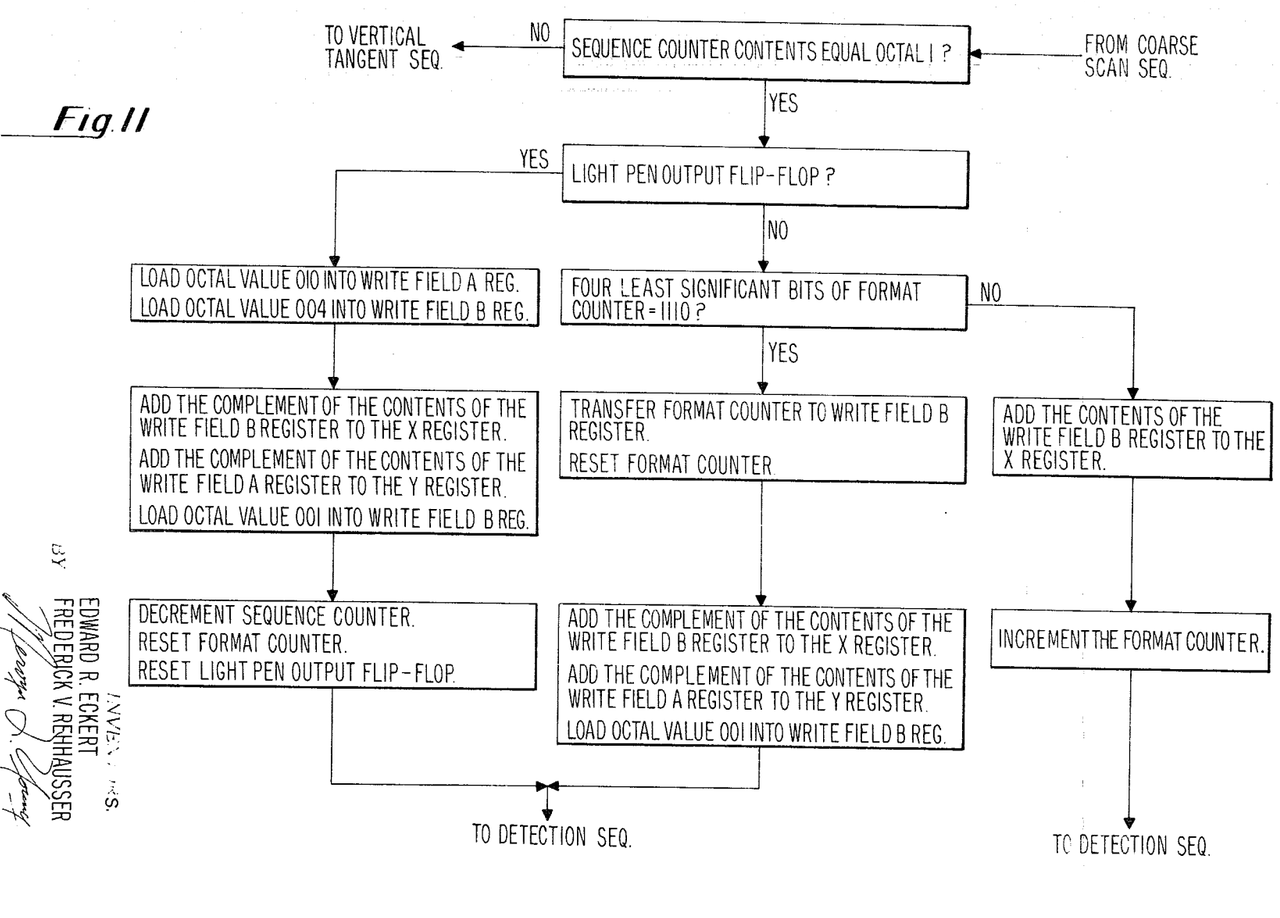
FIG. 11 is a diagram of the horizontal tangent sequence.

The sequence counter having been decremented to 1, the system now enters the horizontal tangent sequence which is illustrated in FIG. 11. Again, the first step in the sequence is to detect if there has been a light pen output signal and, if not, the contents of the write field B register are added to the X register, if the four least significant bits of the format counter do not equal binary 1110. That is to say, the X coordinate is incremented by 1. The format counter is incremented and the system then re-enters the detection sequence.

If the contents of the format counter does equal octal 16, this means that the system has reached the end of the horizontal fine scan. At this time, the contents of the format counter are transferred to the write field B register and the format counter is reset. The contents of the write field B register are then subtracted from the X register. The contents of the write field A register are subtracted from the Y register. The octal value of 1 is loaded into the write field B register and the system again enters the detection sequence.

If a light pen signal has been generated during the fine scan sequence, this indicates that the point of the horizontal tangent of the light pen circle has been located and the system then prepares to go into the vertical tangent sequence. The preparation for entering the vertical tangent sequence is that of loading the octal value of 10 into the write field A register and loading the octal value of 4 into the write field B register. The contents of the write field B register are subtracted from the X register. The contents of the write field A register are then subtracted from the Y register. The octal value of 1 is loaded into the write field B register. The sequence counter is decremented to 0 and the format counter and the light pen output flip-flop are reset and the system again enters the detection sequence.

Figure 12:
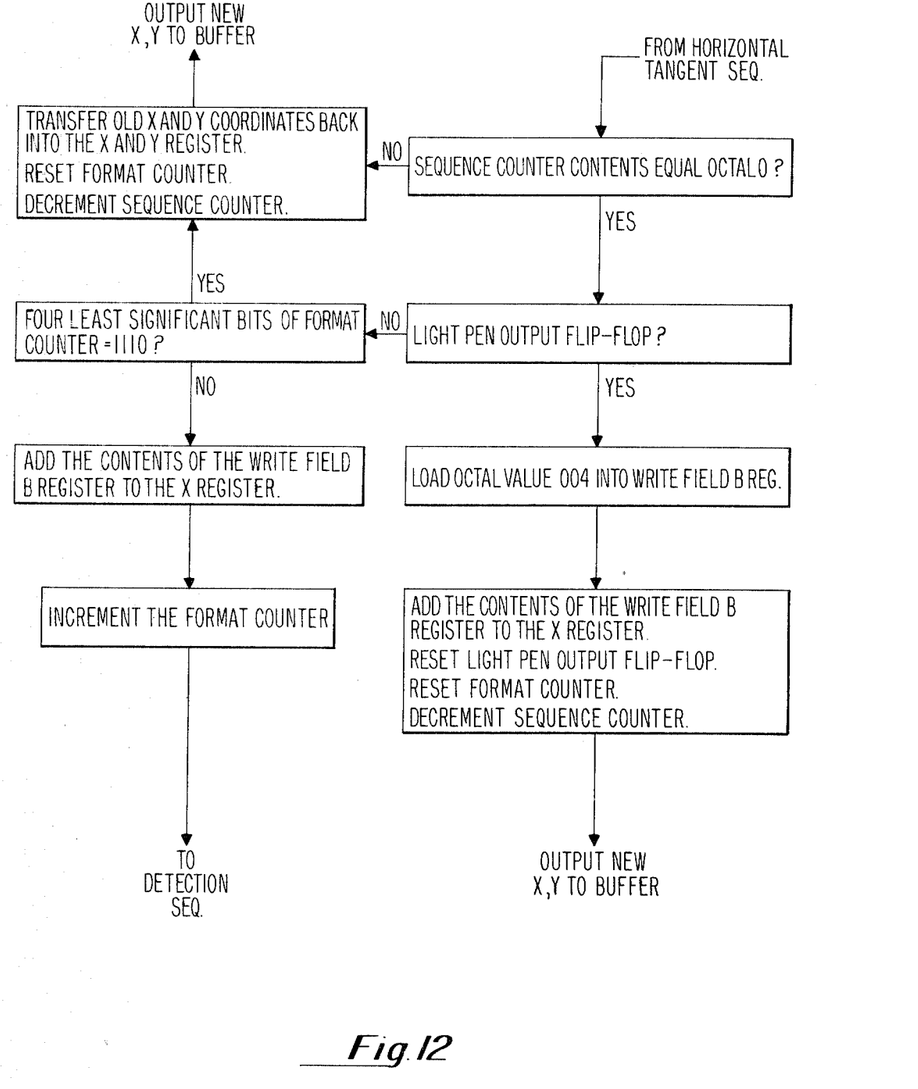
FIG. 12 is a diagram of the vertical tangent sequence.

The vertical tangent sequence is illustrated in FIG. 12 and is entered when the sequence counter equals 0. When the light pen signal was generated in the horizontal tangent sequence, the value of the Y coordinate was reduced by an amount equal to the radius of the light pen circle and it is this coordinate value that is utilized to establish the location from which the vertical tangent sequence is initiated which should then be just a horizontal scan which started to the left of the light pen circle. In this sequence, if no light pen output signal has been detected, then the contents of the write field B register are added to the X register providing the four least significant bits of the format counter do not equal binary 1110. The format counter is incremented and the system again enters the detection sequence. If the contents of the format counter equals binary 1110, then the system has made a scan without finding the light pen circle. That is to say, that the light pen must have been moved, and so the sequence counter is decremented to 3, the format counter is reset and the old X and Y coordinates are transferred back to the X and Y register and the system exits from the entire sequence to await preinitiation of this scan by an operations code being supplied to op code register 54 of FIG. 4.

In this last sequence, if a light pen output signal has been generated, then the octal value of 4 is loaded into the write field B register and this is added to the X register. The light pen output flip-flop is reset as is the format counter. The sequence counter is decremented to 3. The contents of the X and Y registers should now specify the location of the center of the light pen circle. The tracking symbol as seen by the operator is just the array of dots or raster units that were excited during the soarse and fine scans.

Sequence timing

Specific timing waveforms have not been disclosed in this specification. However, it will be appreciated that the system is a digital system except for the conversion of digital signals to analog signals as required by the various deflection amplifiers of the CRT. The system of the present invention then is controlled by a clock and the various steps of the respective sequences are discrete in nature and are executed at specific clock times which, in the present system are referred to as T times. As has been indicated above, a system employing the present invention would also be performing other functions during other phases of operation such as character or vector generation. Thus, the execution of a particular operation or a particular sequence step would depend upon the conditions which exist in the system at a specific T time and during a specific phase.

The master clock is preferably a five magacycle blocking oscillator which provides approximately 50 nanosecond pulses to the logic circuitry. A timing counter (not shown) divides the time per phase into sixteen intervals, T0–T15.

Conclusion

The present invention allows the operator to control the positioning of a tracking symbol with the light pen. This function is useful in accomplishing a variety of other functions. For example, when the display system is provided with appropriate circuitry, the operator can "draw" a line on the face of the CRT by first positioning the tracking symbol at an initial location and then moving the tracking symbol to a final location to specify the end points of the line he wishes to be projected on the face of the CRT. Furthermore, the operator can utilize the tracking symbol to indicate data on the face of the CRT which he may wish to have changed or edited. The operator can also employ the tracking symbol to indicate data already on the face of the CRT which the operator desires to have moved to some other area of the CRT face.

With the present invention, the operator can move the light pen from one location adjacent the CRT face to another such location almost instantaneously and the system of the present invention will again find the position of the light pen and move the tracking symbol to that position. In the particular embodiment that has been illustrated, the coarse scan was described as being carried out in an area of only approximately 0.75 inch square. However, it will be appreciated that this area was chosen because of the practical limitation of the time available for making such a coarse scan during the refresh portion of the CRT cycle when other operations are also to be carried out during that portion. Thus, it will be appreciated that the coarse scan of the present invention can be carried out over the entire face of the CRT.

While a particular embodiment of the present invention has been described and illustrated, it will be apparent to those skilled in the art that changes and modifications may be made therein without departing from the spirit and scope of the invention as claimed.

What is claimed is:

1. A graphic display system including a light detection device having an effective sensing area and a cathode ray tube having a screen area defined by a plurality of raster units, and excitation means to excite individual ones of said units, said system comprising:
    tracking means coupled to said excitation means and adapted to operate in a first mode to activate said excitation means to scan a first area of raster units and in a second mode to activate said excitation means to scan a second area of raster units, said second area being smaller than said first area and including raster units of said first area; and
    sequence control means coupled to said tracking means to cause said tracking means to operate in said first mode and then in said second mode in a sequence.

2. A system according to claim 1 including bistable means coupled to said light detection device and to said tracking means to indicate when an excited raster unit has been detected by said device.

3. A system according to claim 2 including register means coupled to said tracking means to contain signals indicating the location of the excited raster unit detected by said device.

4. A system according to claim 3 including counting means coupled to said tracking means and said sequence control means to provide new signals to said register means after a raster unit has been excited and not detected by said light detection device.

5. A system according to claim 4 including transmission means coupled to said register means and to said excitation means to transmit the signals contained in said register means to said excitation means.

6. In a graphic display system including a light detection device havin an effective sensing area and a cathode ray tube having a screen area defined by a plurality of raster units and excitation means to excite individual ones of said units, a method comprising:
    activating said excitation means to scan a first area of raster units; and
    activating said excitation means to scan a second area of raster units when said first area contains a raster unit detected by said light detection device;
    said second area being smaller than said first area and including raster units of said first area.

7. A method according to claim 6 wherein the activation of said excitation means to scan a first area includes the activation of said excitation means to excite only selected raster units in that area.

8. A method according to claim 6 wherein the activation of said excitation means to scan said second area includes the activation of said excitation means to excite adjacent raster units in that area.

9. A method according to claim 6 wehrein the activation of said excitation means to scan said first area activates said excitation means to scan the entire screen area of raster units.

10. A method according to claim 6 wherein:
    said cathode ray tube is adapted for operation in cycles a portion of which is a refresh portion; and
    said activation of said excitation means is carried out during said refresh portion.

11. A method according to claim 6 including the generation of a symbol within said screen area to indicate the location of said light detection device.

12. A method according to claim 11 wherein the generation of a symbol is an excitation of the previously excited raster units.

References Cited

UNITED STATES PATENTS

| | | | |
|---|---|---|---|
| 3,342,935 | 9/1967 | Leifer et al. | 340—324 X |
| 3,394,366 | 7/1968 | Dye | 315—18 X |

RODNEY D. BENNETT, JR., Primary Examiner

T. H. TUBBESING, Assistant Examiner

U.S. Cl. X.R.

315—18, 22, 23; 340—324